United States Patent [19]

Loren

[11] Patent Number: 4,738,490
[45] Date of Patent: Apr. 19, 1988

[54] WHEEL COVER MOUNTING

[76] Inventor: Norman Loren, 24874 Chalk Farm Rd., Warren, Mich. 48091

[21] Appl. No.: 910,365

[22] Filed: Sep. 22, 1986

[51] Int. Cl.$^4$ .............................................. B60B 7/04
[52] U.S. Cl. .............................. 301/37 TP; 301/37 P; 301/37 PB
[58] Field of Search ............... 301/37 R, 37 P, 37 TP, 301/37 PB, 37 B, 37 CD

[56] References Cited

U.S. PATENT DOCUMENTS

| | | |
|---|---|---|
| 136,513 | 3/1973 | Hering . |
| 771,740 | 10/1904 | McKeel . |
| 1,845,323 | 2/1932 | Neuner . |
| 1,847,228 | 3/1932 | Smith . |
| 1,953,634 | 4/1934 | Reichenback . |
| 3,575,468 | 4/1971 | Kapanka . |
| 3,747,984 | 7/1973 | Andrews et al. . |
| 3,988,040 | 10/1976 | Spisak ............................... 301/37 B |
| 4,027,919 | 7/1977 | Foster et al. . |
| 4,266,831 | 5/1981 | Foster et al. . |
| 4,352,525 | 10/1982 | Foster et al. . |
| 4,457,559 | 7/1984 | Renz . |
| 4,462,640 | 7/1984 | Loren . |
| 4,470,639 | 9/1984 | Loper . |
| 4,512,614 | 4/1985 | Loper ............... 301/37 P |
| 4,529,251 | 7/1985 | Schobbe . |
| 4,596,425 | 7/1986 | Hung . |

FOREIGN PATENT DOCUMENTS

| | | | |
|---|---|---|---|
| 629361 | 10/1961 | Canada . | |
| 0079703 | 6/1980 | Japan ................... | 301/37 P |
| 0039501 | 3/1983 | Japan ................... | 301/37 R |

Primary Examiner—Robert B. Reeves
Assistant Examiner—Russell D. Stormer
Attorney, Agent, or Firm—Brooks & Kushman

[57] ABSTRACT

A wheel cover mounting for plastic wheel covers comprising a mounting portion positioned in axial alignment with and spaced radially inward from a facing surface portion of a vehicle wheel. A spring wire retainer ring including radially outwardly extending projections spaced circumferentially around the ring in a substantially flat plane are received through circumferentially spaced openings in the mounting portion of the wheel cover. At least one, and preferably most if not all, of the openings are defined by guide walls circumferentially spaced apart a distance greater than the circumferential width of the projections in order to reduce frictional forces between the projections and the lugs and maximize the forces retaining the wheel cover on the wheel and in a fixed position with the wheel. The forces maintaining fixed positioning can be further increased by antirotational clips interposed between the wheel cover and a surface fixed for rotation with the wheel to resist relative rotational displacement of the wheel cover with respect to the wheel. Preferably, two spring clips including a resilient tang are disposed at diametrically opposed positions of the wheel cover with their tangs radially inclined in opposite rotational directions. The openings in the mounting portion near the spring clips are defined by guide walls spaced apart from each other a distance greater than the width of the projection extending through the opening so that the loading force of the spring clip does not affect the retaining force applied by the spring wire retainer.

15 Claims, 1 Drawing Sheet

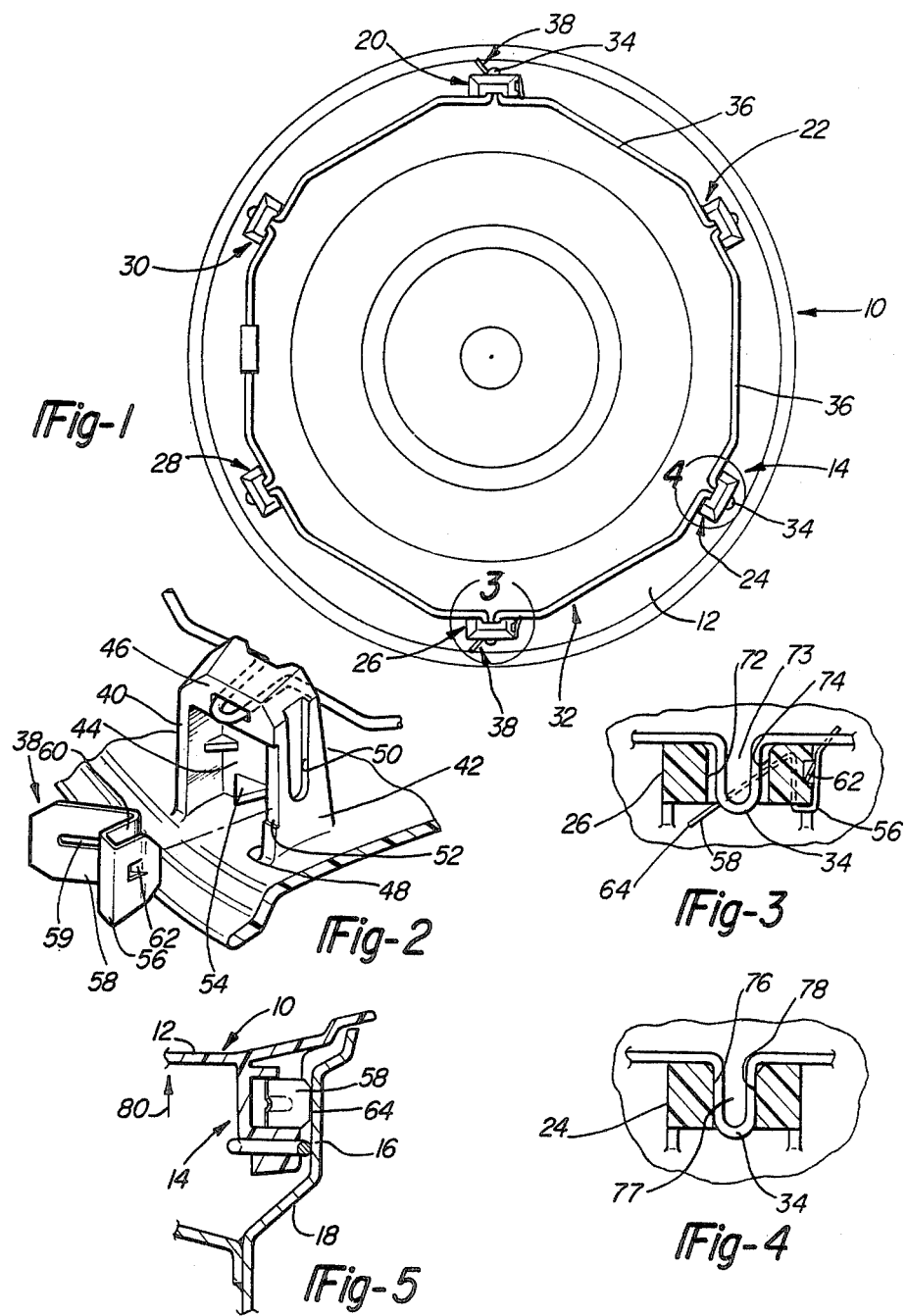

WHEEL COVER MOUNTING

BACKGROUND OF THE INVENTION

1. Field of the Present Invention

The present invention relates generally to wheel covers for motor vehicles, and more particularly to such covers adapted to be retained in position with respect to the wheel by a resilient retaining ring.

2. Description of the Prior Art

It has been known to make wheel covers of a plastic material in order to minimize the weight of the cover or to minimize the expense of making the wheel cover. However, such wheel covers are more susceptible to breakage and distortion than metal wheel covers. In particular, when the means for attaching the wheel cover to the wheel is integrally formed of plastic material with the wheel cover, the forces imposed upon the plastic retaining means can distort the cover as well as the retaining means and reduce the effectiveness of the retaining means. Moreover, when the wheel is subjected to unexpected shocks, the plastic retaining means can be extremely stressed and broken whereby the wheel cover becomes separated from the wheel.

One previously known wheel cover construction intended to alleviate these problems is disclosed in U.S. Pat. No. 4,027,919 to Foster. Foster discloses a wheel cover assembly in which a resilient flexible ring is supported by the wheel cover and resiliently engaged against a portion of the wheel. The projections are formed by return bent portions of spring wire extending through radially aligned apertures formed in axially extending wall portions of the wheel cover. The openings are defined by guide walls dimensioned to peripherally engage the projections to prevent relative axial and circumferential displacement between the retaining ring and the wheel cover.

Nevertheless, while that patent purports to teach that substantially all of the forces for retaining the wheel cover in position on the wheel are absorbed by the ring rather than being transmitted to the cover, the engagement between the projection and the guide walls of the openings transmits loads to the wheel covers and reduces the effective retaining force. Such limitation of the force being exerted on the wheel by the retainer can adversely affect the ability of the wheel cover to retain its position with respect to the wheel. Moreover, in view of the fact that the rounded ends of the projections provide a very small area of engagement with the wheel, the reduction of the retention force substantially affects the ability of the wheel cover to retain its position on the wheel.

Moreover, a substantial amount of torque is applied to the vehicle's wheels during operation of the vehicle. Thus, perhaps the greatest force exerted upon the wheel cover is that which tends to cause relative rotational displacement between the wheel cover and the wheel. The rounded projection of the previously known rings and the limited retention force available in the previously known mounting substantially reduce resistance to circumferential displacement of the ring, and thus the cover, with respect to the wheel. Since the tire valve used for inflating the tire often extends through an opening in the wheel cover, such circumferential displacement can cause deformation and destruction of the tire valve.

SUMMARY OF THE PRESENT INVENTION

The present invention overcomes the above mentioned disadvantages by providing a wheel cover mounting structure in which a retaining ring supported by the wheel cover exerts a greater retention force against the wheel than in the previously known wire retainer structures without increasing the diameter of the wire applying the retaining force. In addition, the present invention permits the introduction anti-rotational means for preventing relative displacement between the wheel cover and the wheel. As a result, the present invention provides a substantially better structure for retaining plastic wheel covers in a fixed position on a vehicle wheel than previously known retaining structures.

In general, the wheel cover includes an axially extending mounting portion including a plurality of circumferentially spaced openings adapted to receive the radial projections of a spring wire retaining ring. The retaining ring includes a corresponding number of circumferentially spaced, radial projections aligned in a substantially flat plane and connected by interconnecting ring portions. The radially outer ends of the projections lie in a circle having a diameter at least slightly greater than the diameter of a facing surface portion of a wheel when the ring is unstressed and the interconnecting portions are resiliently deformable in response to radial displacement of the projections due to engagement with the facing surface of the wheel. However, unlike the previously known supports for such rings, the openings in the mounting portion are formed by circumferentially spaced walls which are spaced apart a distance substantially wider than the width of the projection to sufficiently accommodate deformation of the mounting portion due to load to avoid interference with the retention force of the wire ring.

In addition, an antirotational means for increasing resistance to relative circumferential displacement of the cover and the wheel can be interposed between the cover and a surface fixed for rotation with the wheel. Preferably, a spring clip having a resilient tang is supported on the mounting portion of the wheel cover so that the tang extends at a radially inclined alignment toward the facing surface of the wheel for engagement therewith. However, it should be understood that other antirotational means, for example, a wheel cover boss adapted to engage a wheel mounting lug nut, are also within the scope of the present invention. Moreover, at least one of the openings can include guide walls adapted to engage the side of the projection extending therethrough to prevent relative movement of the retaining ring with respect to the the wheel cover.

In the preferred embodiment, the mounting portion comprises a plurality of lugs circumferentially spaced and extending axially from the wheel cover. Each of two diametrically opposed lugs are adapted to receive a retaining clip having a tang resiliently urged radially outwardly from the body in registration with the facing surface of the wheel. The clips are mounted so that the tangs of the diametrically opposed clips are mounted to extend in opposite rotational directions. Furthermore, the tang includes an edge axially aligned with the wheel for ease of removal and resistance to circumferential movement. These diametrically opposed lugs include openings defined by circumferentially spaced guide walls spaced apart a distance greater than the width of the projections to prevent any deformation of the lug, due to loading by the spring clip, from interfering with the retention force applied by the spring wire retainer.

Thus, the present invention permits a spring wire retainer of known construction to exert substantially greater force against a facing wheel surface than previously known retainer mounts without modifications of the wire. In addition, the present invention effectively reduces relative circumferential displacement between the wheel cover and the wheel. The invention also limits the amount of retaining force which must be exerted by a wire retainer to provide secure attachment of a plastic wheel cover to the wheel against all types of displacement. Nevertheless, the wheel cover is readily dislodged from the wheel in an axial direction when removal is desired even though the resistance to rotational movement of the cover with respect to the wheel is enhanced. These and other advantages of the present invention will discussed in greater detail in the following detailed description.

BRIEF DESCRIPTION OF THE DRAWING

The present invention will be better understood by reference to the following detailed description of a preferred embodiment when read in conjunction with the accompanying drawing in which like reference characters refer to like parts throughout the views and in which:

FIG. 1 is a plan view of a wheel cover incorporating a mounting according to the present invention;

FIG. 2 is an enlarged perspective view of a portion of the wheel cover shown in FIG. 1;

FIG. 3 is an enlarged sectional view taken through a portion of FIG. 1 identified by detail 3;

FIG. 4 is an enlarged sectional view of a portion of FIG. 1 designated by detail 4; and FIG. 5 is an enlarged, fragmentary sectional view showing the cooperation of the vehicle mounting means with a vehicle wheel.

DETAILED DESCRIPTION OF A PREFERRED EMBODIMENT

Referring first to FIG. 1, a wheel cover 10 is thereshown comprising a plastic body 12 including a mounting portion 14. As best shown in FIG. 5, the mounting portion 14 extends axially inward from the body 12 so as to be positioned in axial alignment with and radially inward from a facing surface portion 16 of a vehicle wheel 18. While the mounting portion 14 can be in the form of an annular wall formed on the body 10, in the preferred embodiment, six lugs numbered 20, 22, 24, 26, 28 and 30 are circumferentially spaced about the body on a circle having a diameter slightly smaller than the diameter of the facing surface 16 of the wheel 18.

As also shown in FIG. 1, a spring wire retaining ring 32 includes a plurality of radially outwardly extending projections 34 connected by interconnecting wire portions 36. The projections 34 are arranged to lie in a substantially flat plane in spaced positions corresponding to the positions of the lugs 20-30. Each of the lugs 20-30 includes an aperture adapted to receive a respective projection 34 in a manner to be described in greater detail hereinafter.

As also shown in FIG. 1, increased resistance to relative rotational movement between the wheel cover and the wheel is provided by an antirotational means for resisting relative circumferential displacement between the wheel cover 10 and the wheel 18 comprises a spring clip 38 mounted to each of the lugs 20 and 26. Each spring clip 38 is interposed between the mounting portion 14 and the facing surface 16 of the wheel 18 as will be discussed in greater detail with respect to FIG. 5.

The lugs 20 and 26 are similar to the lugs 22, 24, 28 and 30 in that each of these lugs include a pair of support walls joined by an endwall 44 (FIG. 2) and supporting a retaining head 46 (FIG. 2). The retaining head 46 includes an aperture adapted to receive a projection 34 of the spring wire retaining ring 32 as will be described in greater detail hereinafter. Moreover, the walls of each lug define a cavity 48 (FIG. 2) which will be described in greater detail with respect to the lugs 20 and 26. Each opening is axially limited by axially spaced head walls which restrict axial movement of the projections 34 within the opening.

The lugs 20 and 26 differ from the remaining lugs 22, 24, 28 and 30 in that they are particularly adapted to receive the spring clips 38. Thus, while each of the lugs 22, 24, 28 and 30 include a pair of sidewalls like the sidewall 40 shown in FIG. 2, the lugs 20 and 26 include a modified sidewall 42. As shown in FIG. 2, the sidewall 42 of lugs 26 is particularly adapted to include means for supporting the spring clip 38. In particular, sidewall 42 is thicker than the sidewall 40 to form a rigid support for the spring clip 38. In addition, the sidewall 42 includes a locking recess 50 and guide means for the spring clip 38 such as the radial, guide recess 52. As shown in FIG. 2, the lug 26 also includes a support shelf 54 extending radially outwardly from the endwall 44 with the cavity 48.

The spring clip 38, as best shown in FIGS. 2 and 3, comprises a spring metal sheet folded to form a mounting shoulder 56 and a resilient tang 58 in the form a flat flange having a reinforcement rib 59 (FIG. 2). The shoulder portion 56 defines a channel 60 adapted to receive the sidewall 42 therein while the endwall of the shoulder 56 fits in the recess 52. One sidewall of the shoulder portion 56 includes a locking prong 62 positioned for receipt within the recess 50 in the lug 26. The spring clip 38 is mounted in position on the lug 26 as shown in FIG. 3 so that the tang 58 protrudes radially outwardly from the lug at a radial inclination a shown in FIG. 3, while the wide edge 64 of the flange forming the tang 58 is axilly aligned and engageable with the facing surface 16 of the wheel 18 as shown in FIG. 5.

As shown in FIG. 1, the lug 20 is substantially similar to the lug 26 except that the thickened sidewall 42 including the retaining slot 50 and the guide recess 52 is formed on the opposite side of the lug. As a result, the tang 58 of the spring clip 38 extending outwardly from the cavity 48 in the lug 20 is inclined in an opposite rotational direction from the tang 58 extending outwardly from the cavity 48 in lug 26. Thus, the two spring clips 38 secured to the lugs 20 and 26 prevent relative rotational displacement of the wheel cover with respect to the wheel in both rotational directions. Moreover, only the sidewall 42 of each of the lugs 20 and 26 need be thickened in order to resist the force being applied to the spring clip due to its engagement with the facing surface 16 of the wheel 18. Thus, it will be readily understood each of the lugs 22, 24, 28 and 30 includes a pair of sidewalls 40 substantially in the form of sidewall 40 shown in FIG. 2.

Another distinguishing feature between the lugs 20 and 26 on the one hand, and the lugs 22, 24, 28 and 30 on the other, is in the openings adapted to receive the projections 34 as best shown with reference to FIG. 3 and 4. In FIG. 3, the lug 26 includes an opening 73 which is defined by guide walls 72 and 74. The guide walls 72 and 74 are spaced apart a distance greater than the width of the projection 34. Thus, even if the lug 26 is resilient distorted by load applied by the spring clip 38, the projection remains free from frictional engagement with the walls 72 and 74. The lug 20 is also constructed with a similar opening 73.

While the remaining lugs 22, 24, 28 and 30 can also be provided with similar openings 73 defined by spaced guide walls 74 and 72, the lug 24 is shown in FIG. 4 having an opening 77 defined by guide walls 76 and 78 which are spaced apart a distance substantially the same as the width of the projection 34. Thus, the walls 76 and 78 are engageable with the sides of the projection 34 to prevent relative rotational displacement between the retainer 32 and the wheel cover 10. As a result, the resilient force exerted by the remaining projections 34 more efficiently prevents undesirable rotational displacement between the wheel cover 10 and the wheel 18 when the wheel cover 10 is installed on the wheel 18. Thus, the retaining force is increased over the previously known spring wire retaining means previously employed with plastic wheel covers.

When the wheel cover 10 is installed on a wheel 18 as shown in FIG. 5, each of the lugs defining the mounting portion 14 are disposed radially inwardly from the axially aligned with the facing surface portion 16 of the wheel 18. The projections 34 extending through the openings 73 and 77 in the lugs 22, 24, 28 and 30 are resiliently urged against the facing surface 16 by the interconnecting portions 36. The projections 34 extending through the openings 73 can be radially displaced without restriction by the wall surfaces 72 and 74 peripherally defining the openings. Moreover, the resilient tangs 58 of the spring clips 38 also exert a small radial force against the facing surface portion 16 of the wheel 18. More importantly, since the tang 58 is radially inclined and resilient, any retaining force load exerted against the sidewall 42 which would tend to deform the lug and restrict radial displacement of the projection 34 does not increase frictional engagement between the projection and the lug.

Moreover, since the wide edge 64 of the tang 58 is substantially axially aligned, the edge 64 engages an axially elongated surface portion of the facing surface 16 and restricts rotational displacement of the cover 10 with respect to the wheel 18 to a substantially greater degree than the rounded projections 34. In addition, the radial inclination of the tang 58 positions the tang for substantially greater resistance to rotation in one circumferential direction. Thus, by providing two clips 38 at diametrically opposed positions of the wheel cover with their tangs radially inclined in opposite directions, the clips 38 substantially increase resistance to relative circumferential displacement between the wheel cover and the wheel in both rotational directions. Moreover, only minimal stress is exerted upon the mounting portion 14 of the wheel cover 10. Moreover, the mounting provides substantially greater retaining force in all directions than previously known rotational ring mounting arrangements. Nevertheless, since removal of the cover 10 from the wheel 18 is accomplished by axial displacement of the wheel cover 10 from the wheel 18, as shown by the direction of arrow 80 in FIG. 5, the edge 64 provides minimal resistance to forced removal of the wheel cover when removal is desired.

In additional, it may be appreciated that some wheels, particularly driven and steerable wheels employed on front wheel drive cars, include an axially extended central or spider portion. It is to be understood that spring clips of the type shown in the preferred embodiment could also be mounted so that the tang 58 extends radially inwardly toward a facing surface of the spider. To accommodate such a mounting, the lugs 26 shown in FIG. 4 would be reversed in position so that the end wall 44 is positioned at the radially outer edge of sidewall 40 and 42.

Having thus described the preferred embodiment of the present invention, many modifications to these teachings will become apparent to those skilled in the art to which it pertains without departing from the scope and spirit of the present invention as defined in the appended claims.

What is claimed is:

1. A wheel cover for attachment to a wheel having a substantially axially extending radially inwardly facing surface portion comprising:
   a body including a mounting portion positioned in axial alignment with and spaced radially inward from the facing surface portion of the wheel; and
   a spring wire ring carried by said mounting portion, said wire ring having a plurality of radially outwardly extending projections spaced circumferentially around said ring and connected by interconnecting ring portions, wherein said projections lie in a substantially flat plate and the radially outer ends of said projections define a circle having a diameter at least slightly greater than the diameter of the facing surface of the wheel when the ring is unstressed, and wherein said interconnecting portions are resiliently deformable in response to radial displacement of said projections and relatively free from said body in a radial direction to permit resilient radial displacement of said projection; and
   wherein said mounting portion comprises circumferentially spaced, radially aligned apertures at positions corresponding to said projections, each aperture being dimensioned to slidably receive a respective projection while restricting axial displacement of said ring with respect to said circumferentially wider than the circumferential width of its respective projection to allow non-interfering reciprocal radial movement of the wire ring projections regardless of the deflection of the mounting portion due to loading from installation of the wheel cover.

2. The invention as defined in claim 1 wherein all of said apertures are circumferentially wider than their respective projections, and further comprising antirotational means for resisting relative circumferential displacement between said cover and said wheel.

3. The invention as defined in claim 1 wherein a single one of said plurality of apertures is defined by circumferentially spaced guide walls spaced apart a distance substantially equal to the width of said rdaial projections for engagement with the sides of one of said projections.

4. The invention as defined in claim 1 wherein said mounting portion comprises a plurality of circumferentially spaced lugs extending axially from said body, each said lug having one of said apertures.

5. The invention as defined in claim 1 and further comprising antirotational means interposed between said body and a surface fixed for rotation with said wheel for resisting relative circumferential displacement between said cover and said wheel.

6. The invention as defined in claim 5 wherein said at least one of said apertures is circumferentially aligned with said antirotational means.

7. The invention as defined in claim 5 wherein said antirotational means comprises at least one spring clip having a resiliently biased tang and means for mounting said clip to said body so that said tang is urged radially from said body in registration with a facing surface of the wheel.

8. The invention as defined in claim 7 wherein each of said at least one spring clip is mounted adjacent to one of said at least one circumferentially wider aperture.

9. The invention as defined in claim 7 wherein said tang comprises a substantially flat flange having a wide edge aligned substantially axially with respect to the wheel.

10. The invention as defined in claim 7 wherein said tang is radially inclined toward a first rotational direction.

11. The invention as defined in claim 7 wherein said mounting portion of said body comprising a plurality of circumferentially spaced lugs extending axially from said body, each lug having one of said plurality of apertures.

12. The invention as defined in claim 10 wherein two substantially diametrically opposed lugs include apertures defined by circumferentially spaced walls spaced apart a distance greater than the width of their respective projections and wherein said antirotational means comprises one of said clips mounted on each of said two lugs.

13. The invention as defined in claim 12 wherein said clips include tangs radially inclined toward opposite circumferential directions.

14. The invention as defined in claim 10 wherein at least two lugs include apertures defined by circumferentially spaced walls spaced apart a distance greater than the width of their respective projections and wherein said antirotational means comprises one of said spring clips mounted on each of said two lugs.

15. The invention as defined in claim 14 wherein said clips include tangs radially inclined toward opposite circumferential directions.

* * * * *

UNITED STATES PATENT AND TRADEMARK OFFICE
CERTIFICATE OF CORRECTION

PATENT NO.   : 4,738,490
DATED        : April 19, 1988
INVENTOR(S)  : Norman S. Loren It is certified that error appears in the above-identified patent and that said Letters Patent is hereby corrected as shown below:     Title page:

In the References:

"3/1973" for Hering should be --3/1873--.

"Reichenback" should be --Reichenbach--.

In the Specification:

| | |
|---|---|
| Column 3, Line 6 | "modifications" should be --modification--. |
| Column 4, Line 22 | "lugs" should be --lug--. |
| Column 4, Line 42 | "a" should be --as--. |
| Column 4, Line 44 | "axilly" should be --axially--. |
| Column 5, Line 4 | "resilient" should be --resiliently--. |
| Column 5, Line 18 | "efficiently" should be --effectively--. |
| Column 5, Line 67 | "additional" should be --addition--. |

In the Claims:

| | |
|---|---|
| Column 6, Line 28, Claim 1 | "plate" should be --plane--. |
| Column 6, Line 42, Claim 1 | after "said" (second occurrence) insert --body, and wherein at least one of said apertures is--. |

UNITED STATES PATENT AND TRADEMARK OFFICE
CERTIFICATE OF CORRECTION

PATENT NO. : 4,738,490

DATED : April 19, 1988

INVENTOR(S) : Norman S. Loren

It is certified that error appears in the above-identified patent and that said Letters Patent is hereby corrected as shown below:

Column 6, Line 57, Claim 3    "rdaial" should be --radial--.

Column 7, Line 21, Claim 11   "comprising" should be --comprises--.

Signed and Sealed this

Twenty-first Day of February, 1989

*Attest:*

DONALD J. QUIGG

*Attesting Officer*    *Commissioner of Patents and Trademarks*